(12) United States Patent
Garg

(10) Patent No.: US 6,678,285 B1
(45) Date of Patent: Jan. 13, 2004

(54) NETWORK APPLIANCE WITH SIMPLIFIED NETWORK TRANSMITTER

(75) Inventor: Atul Garg, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/517,351

(22) Filed: Mar. 2, 2000

(51) Int. Cl.[7] ................................................. H04J 3/24
(52) U.S. Cl. .................. 370/473; 370/474; 379/106.03
(58) Field of Search .................. 370/241, 242, 370/247, 252, 254, 351, 480, 470, 473, 474, 475, 476, 481, 482; 340/853.1, 853.2, 855.4; 379/32.01, 106.03, 106.07, 106.08; 375/224, 286, 295, 298, 299, 353, 316

(56) References Cited

U.S. PATENT DOCUMENTS 6,253,238 B1 * 6/2001 Lauder et al. .............. 709/217
6,373,817 B1 * 4/2002 Kung et al. ................. 370/217
6,377,782 B1 * 4/2002 Bishop et al. ............. 455/3.01
6,418,169 B1 * 7/2002 Datari .................... 375/240.28
6,574,237 B1 * 6/2003 Bullman et al. ............ 370/465

* cited by examiner

*Primary Examiner*—David Vincent
(74) *Attorney, Agent, or Firm*—Renner, Otto, Boisselle & Sklar

(57) ABSTRACT

A network appliance with a simplified network transmitter architecture includes a measurement/detection circuit for detecting a condition and generating a report signal corresponding to the measured or detected condition. A transmitter selects one of a plurality of condition reporting transmission frames corresponding to the measured or detected transmission and transmits the condition reporting transmission frame to a remote monitoring device across a network.

19 Claims, 3 Drawing Sheets

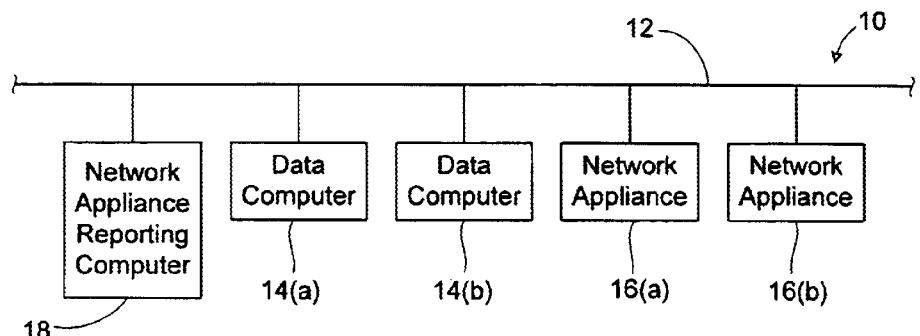
FIG. 1
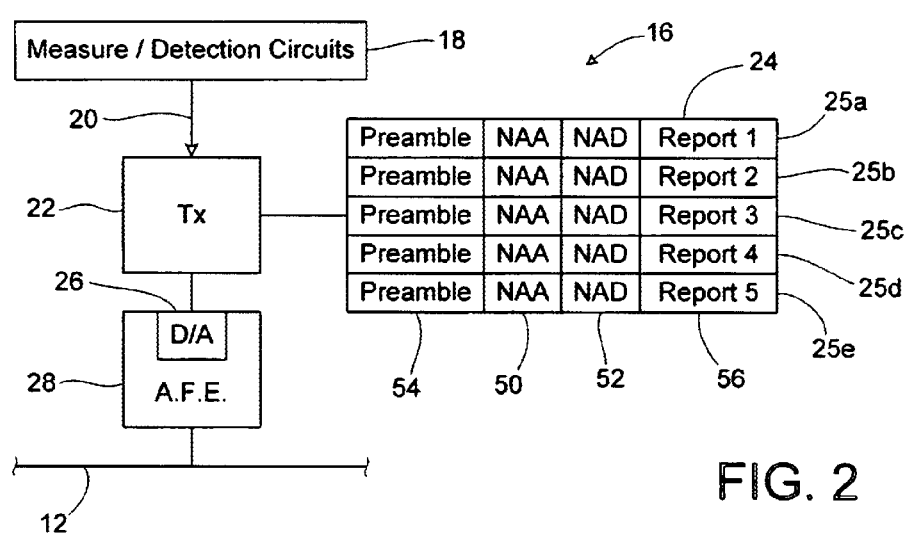
FIG. 2
| Condition | Bit 1 | Bit 2 | Digital Data Values Representing Frame |
|---|---|---|---|
| No Smoke - Good Battery | High | High | Tx 1 |
| No Smoke - Battery Alert | High | Low | Tx 2 |
| Smoke Alert - Good Battery | Low | Low | Tx 3 |
| Error ( e.g. No Signal ) | Low | Low | Tx 4 |
FIG. 3

NETWORK APPLIANCE WITH SIMPLIFIED NETWORK TRANSMITTER

TECHNICAL FIELD

The present invention relates generally to network appliances, and more particularly, to network appliances configured to measure or detect certain physical conditions and report such conditions to a remote monitoring device via a wired or wireless data network.

BACKGROUND OF THE INVENTION

In recent years, businesses in most all industries have improved their productivity by linking their computer systems via a local area network and/or wide area network and installing software systems to track and manage the status of the business's operations. This has enabled businesses to automate many tasks that were traditionally performed using manual paper based systems.

The network infrastructure employed in such systems typically includes a cabled backbone communicating data between various computing systems utilizing a protocol such as Ethernet. The physical topology of the cabled backbone complies with the chosen standard and typically will provide for the coupling of computing systems throughout most geographic areas of the facility. Each computing device typically includes a network interface card (NIC) which interfaces with the computer's operating system software and includes hardware and firmware for transmitting and receiving data across the network backbone.

These types of networks have evolved to include other types of intelligent systems such as application specific network appliances.

While it has been contemplated that various application specific devices such as smoke detectors or security alarms could be coupled to a remote computer utilizing such a network, such devices have not heretofore been practical. Coupling such a device to the network backbone using existing technology would require a processor and network interface circuitry for encoding the data into an Ethernet compliant message, modulating the message onto a carrier signal, and transmitting to a remote computing device via the network. The cost and size associated with such an implementation could significantly increase the cost of the device. Further yet, as complex modulation schemes, frequency diverse redundant data schemes and other schemes used to improve data transmission rates and reduce bit error rates become more complicated, the circuitry required to interface with other devices on the network also becomes more complicated and thus expensive. Again, a full implementation of the network protocol in such devices is expensive and unnecessary.

Therefore, what is needed is an inexpensive network appliance with an electronic architecture which enables such an appliance to be coupled to a network and to report measured or detected conditions to a remote computer via such network without suffering the disadvantages of known technology.

SUMMARY OF THE INVENTION

A first object of this invention is to provide a network appliance transmitter comprising a memory storing transmission signal values representing a transmission frame of a predetermined message complying with a predetermined network protocol, and a transmitter coupled to the memory generating a modulated carrier signal representing the transmission frame. Preferably, the transmission signal values represent a network address of a remote computing device, a network address of the network appliance, a network protocol compliant preamble and message data. The memory may store transmission signal values representing a plurality of transmission frames, each transmission frame including distinct message data.

In one embodiment, the transmission signal values represent a modulated carrier signal and the transmitter includes a D/A converter receiving the transmission signal values and outputting the modulated carrier. The modulated carrier signal may be a quadrature amplitude modulated carrier signal.

In a second embodiment, the transmission signal values represent a base band transmission and the transmitter includes a mixer for mixing the base band transmission up to a carrier frequency and a D/A converter for generating the modulated carrier. Again, the modulated carrier signal may be a quadrature amplitude modulated carrier signal.

In a third embodiment, the transmission signal values represent a base band transmission and the transmitter includes a D/A converter generating an analog base band signal and an analog mixer for generating the modulated carrier. Yet again, the modulated carrier signal may be a quadrature amplitude modulated carrier signal.

A second objective of the present invention is to provide a network device for reporting one of a plurality of conditions to another network device across a data network, the device comprising: a) a detection circuit for detecting a condition and generating a condition signal representative of such condition; b) a memory storing transmission signal values representing a transmission frame of a predetermined message complying with a predetermined network protocol; and b) a transmitter coupled to the memory generating a modulated carrier signal representing the transmission frame. Preferably, the transmission signal values represents a network address of the remote computing device, a network address of the network appliance, a network protocol compliant preamble and message data. The memory may store transmission signal values representing a plurality of transmission frames, each transmission frame including distinct message data.

In one embodiment, the transmission signal values represent a modulated carrier signal and the transmitter includes a D/A converter receiving the transmission signal values and outputting the modulated carrier.

In a second embodiment, the transmission signal values represent a base band transmission and the transmitter includes a mixer for mixing the base band transmission up to a carrier frequency and a D/A converter for generating the modulated carrier.

In a third embodiment, the transmission signal values represent a base band transmission and the transmitter includes a D/A converter generating an analog base band signal and an analog mixer for generating the modulated carrier.

A third objective of the present invention is to provide a method of reporting a condition to a remote computing device, the method comprising: a) detecting the condition and generating a signal representative thereof; b) selecting a transmission frame corresponding to the condition from a plurality of transmission frames prestored in a memory; and c) transmitting the selected transmission frame on a network backbone. Preferably, the transmission frame is stored as a sequence of digital values representing a modulated carrier and transmitting the selected transmission frame includes clocking the sequence of values into a D/A converter to generate a modulated carrier signal.

Alternatively, the transmission frame may be stored as a sequence of digital values representing a base band signal and transmitting the selected transmission frame includes mixing the base band signal up to sequence of values representing a modulated carrier and clocking the sequence of values into a D/A converter to generate a modulated carrier signal.

Alternatively yet, the transmission frame may be stored as a sequence of digital values representing a base band signal and transmitting the selected transmission frame includes clocking the baseband signal into a D/A converter to generate an analog base band signal and mixing the analog base band signal with a carrier signal to generate a modulated carrier signal.

BRIEF DESCRIPTION OF THE DRAWINGS

FIG. 1 is block diagram representing a local area network in accordance with an embodiment of this invention;

FIG. 2 is a block diagram of a network appliance in accordance with a first embodiment of this invention;

FIG. 3 is a table representing information stored in a memory in accordance with one embodiment of this invention;

DESCRIPTION OF THE PREFERRED EMBODIMENTS

Figure 4:
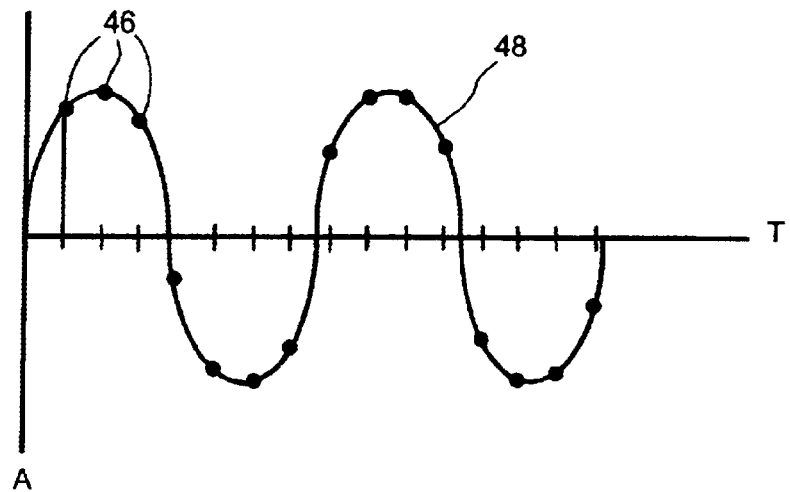
FIG. 4 is a time domain diagram of a modulated carrier in accordance with this invention.

The present invention will now be described in detail with reference to the drawings. In the drawings, like reference numerals are used to refer to like elements throughout.

Referring to FIG. 1, a network 10 includes a network backbone 12 interconnecting a plurality of data computing devices 14(a) and 14(b). The network backbone 12 utilizes a network protocol for data communication such as Ethernet, HPNA 1.0/2.0, or other network protocol and the physical topology of the backbone 12 complies with the specification of such protocol. Data computing devices 14(a) and 14(b) can be typical desk top computers and/or servers and, as discussed previously, are typically coupled to the network backbone 12 utilizing network interface cards.

Also coupled to the network backbone 12 are a plurality of network appliances 16(a) and 16(b) which function to measure and/or detect a physical condition and transmit a reporting message transmission frame representing such condition on the network backbone 12 to a network appliance monitoring computer 18. A detailed discussion of the network appliance 16 is included later herein. The network appliance monitoring computer 18 monitors the network backbone 12 for reporting message transmission frames and compiles a report of the conditions at various network appliances 16 in a human useable form for an operator. Typically the network appliance monitoring computer 18 will be a standard desk-top computer operating network appliance reporting software as can readily be developed by those skilled in the art.

Turning to FIG. 2, a first embodiment of the network appliance 16 may include measurement/detection circuitry 19 for measuring or detecting a physical condition and generating a condition signal 20 representing the measured or detected condition. Examples of such measurement/detection circuitry 19 may include: 1) smoke detection circuitry generating a signal indicating whether smoke has been detected; 2) battery power detection circuitry generating a signal indicating whether a battery has an adequate charge to continue to power a device; 3) motion detector reporting whether motion has been detected within a zone; 4) temperature measurement circuitry reporting the temperature measured at the location; or 5) other measurement or detection circuitry. It should be appreciated that the above listed examples of measurement/detection circuitry 19 are for purposes of illustration only and are not intended to limit the scope of the present invention.

The condition signal 20 is coupled to a transmitter circuit 22. Also coupled to the transmitter circuit 22 is a memory 24. The memory 24 may be a random access memory or a non-volatile memory and it stores digital data values representing each of a plurality of reporting message transmission frames 25(a)–(e) corresponding to each of the possible measurement/detection conditions that may be represented by signal 20. For example, referring to FIG. 3, the possible conditions that may be reported by a battery powered smoke detector include: 1) No smoke, good battery; 2) no smoke, battery alert; 3) smoke alert, good battery; and 4) error. Because there are four possible conditions, the condition signal 20 must be at least a 2-bit serial or parallel signal. In the preferred embodiment, each condition is represented by at least one high bit such that the lack of any high bits will indicate an error condition, which for purposes of this invention is also a condition.

Referring to the time domain diagram of a modulated carrier signal of FIG. 4 in conjunction with the block diagram of FIG. 2, the reporting message transmission frames 25(a)–(e) are stored in memory 24 as a series of data values 46 which digitally representing the modulated carrier signal 48 for the entire transmission frame 25 including the network address 50 of the network appliance 16, the network address 52 of the network appliance monitoring computer 18 (FIG. 1), a network compliant preamble 54, and the reporting data 56. Preferably a quadrature amplitude modulation (QAM) scheme is used for calculating each of the data values 46 such that the modulated carrier signal 28 is a QAM signal.

As such, the transmitter circuit 22 includes a D/A converter 26 for converting the data values 46 to the transmission frame modulated carrier signal 48 when appropriately clocked into the D/A converter 26 and analog front end circuitry 28 for coupling the modulated carrier to the network backbone 12.

Figure 5:
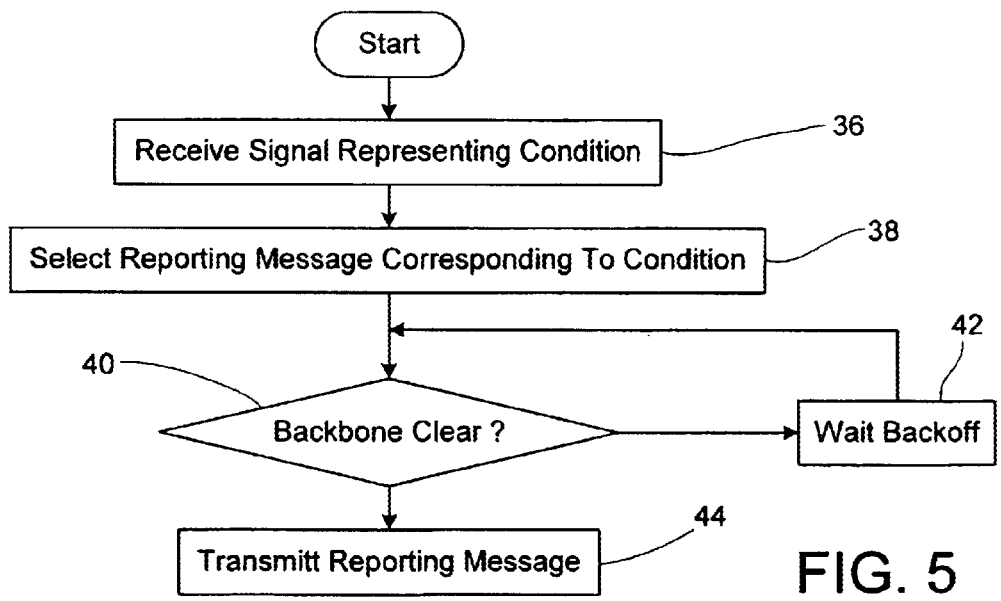
FIG. 5 is a flow chart showing operation of one embodiment of this invention.

Referring to the flowchart of FIG. 5 in conjunction with the block diagram of FIG. 2, the transmitter circuit 22 receives the condition signal 20 representing the measured or detected condition at step, 36. At step 38, the transmitter circuit 22 selects the reporting message transmission frame corresponding to the condition signal 20 from the memory 24. At step 40, the transmitter circuit 22 detects whether the backbone 12 is clear, and if it is, it transmits the reporting message transmission frame on the network backbone 12 at step 44. Alternatively, if the network backbone 12 is not clear, the transmit circuit 22 waits a back-off time at step 42 before returning again to check if the network backbone 12 is clear.

It should be appreciated that in the most simple implementation, the condition signal 20 may be an input to discrete logic components in transmitter circuitry which, upon the condition signal's 20 transition to high, the contents to memory is input to a shift register. A clock then clocks out the shift register into the D/A converter 26 to generate the modulated carrier signal for the transmission frame.

Figure 6:
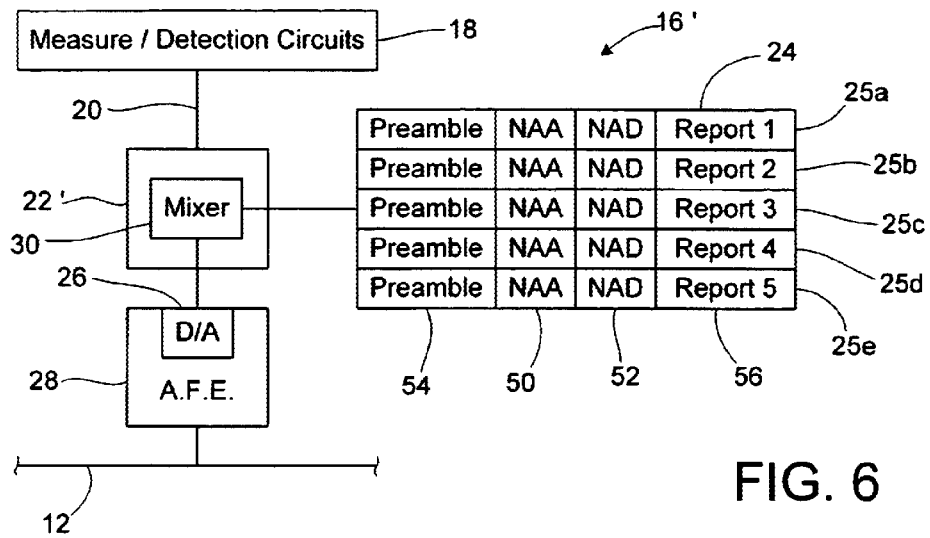
FIG. 6 is a block diagram of a network appliance in accordance with a second embodiment of this invention.

Referring to FIG. 6, in a second embodiment of the network appliance 16', each reporting message transmission frame 25(*a*)'–(*e*)' is stored in memory 24 as a series of values representing a baseband reporting signal for the entire transmission frame 25', again including the network address 50 of the network appliance 16, the network address 52 of the network appliance monitoring computer 18 (FIG. 1), a network compliant the preamble 54, and the reporting data 56. As such, the transmitter circuitry 22' includes a mixer 30 receiving the baseband reporting signal from memory 24 and mixing the baseband reporting signal with a digital carrier signal to generate a digital representation of a modulated carrier signal. The digital representation of the modulated carrier signal is then input to a D/A converter to generate the modulated carrier signal which again is appropriately amplified in the analog front end 28 for transmission on the network backbone 12.

Figure 7:
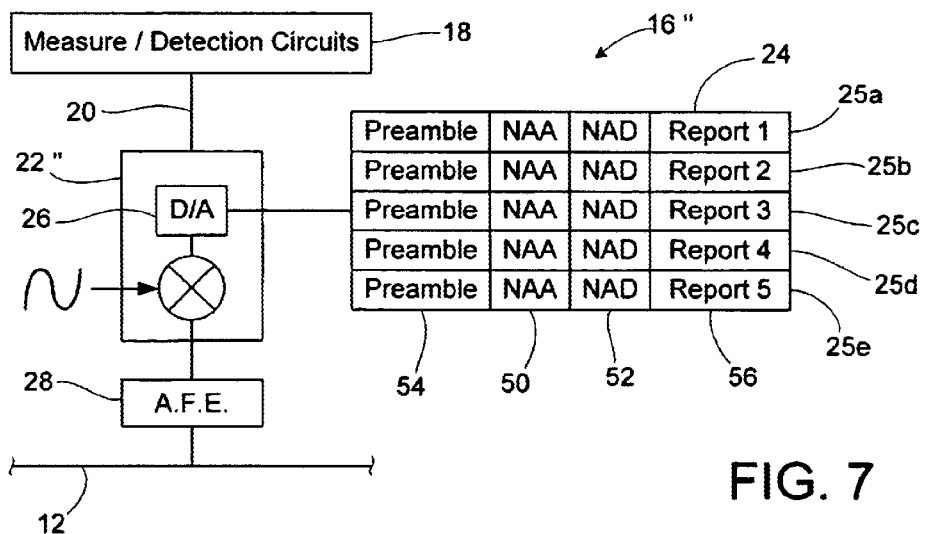
FIG. 7 is a block diagram of a network appliance in accordance with a third embodiment of this invention.

Referring to FIG. 7, in a third embodiment of the network appliance 16", each reporting message transmission frame 25(*a*)–(*e*) is stored in memory 24 as a series of values representing a baseband reporting signal for the entire transmission frame including the network address 50 of the network appliance 16, the network address 52 of the network appliance monitoring computer 18 (FIG. 1), a network compliant the preamble 54, and the reporting data 56. The transmitter circuitry 22' includes a D/A converter 26 for generating an analog baseband signal and an analog mixer 32 mixing the analog baseband signal with an analog carrier to generate the carrier. The modulated carrier is then appropriately amplified in the analog front end for transmission on the network backbone 12.

It should be appreciated that the network of this invention, including the network appliances of this invention provide for a cost effective system for reporting data to a remote device. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A network appliance transmitter comprising:
   a) a memory for storing transmission signal values in a format of a transmission frame of a predetermined message, the format complying with a predetermined network protocol for transmission frames; and
   b) a transmitter coupled to the memory for retrieving the transmission signal values from the memory in the format of the transmission frame, generating a modulated carrier signal including the transmission frame, and transmitting the transmission frame via the modulated carrier signal.

2. The network appliance transmitter of claim 1, wherein the transmission signal values include a network address of a remote computing device, a network address of the network appliance, a network protocol complaint preamble and message data.

3. The network appliance transmitter of claim 2, wherein the memory stores transmission signal values representing a plurality of transmission frames, each transmission frame including distinct message data.

4. The network appliance transmitter of claim 3, wherein the transmission signal values are stored in the memory as a digitized modulated carrier signal and the transmitter includes a D/A converter receiving the transmission signal values and outputting the modulated carrier.

5. The network appliance transmitter of claim 4, wherein the modulated carrier signal is a quadrature amplitude modulated carrier signal.

6. The network appliance transmitter of claim 3, wherein the transmission signal values represent a base band transmission and the transmitter includes a mixer for mixing the base band transmission up to a carrier frequency and a D/A converter for generating the modulated carrier.

7. The network appliance transmitter of claim 6, wherein the modulated carrier signal is a quadrature amplitude modulated carrier signal.

8. The network appliance transmitter of claim 3, wherein the transmission signal values represent a base band transmission and the transmitter includes a D/A converter generating an analog base band signal and an analog mixer for generating the modulated carrier.

9. The network appliance transmitter of claim 8, wherein the modulated carrier signal is a quadrature amplitude modulated carrier signal.

10. A network device for reporting one of a plurality of conditions to another network device across a data network, the device comprising:
    a) a detection circuit for detecting a condition and generating a condition signal representative of such condition;
    b) a memory for storing transmission signal values in a format of a transmission frame of a predetermined message, the format complying with a predetermined network protocol for transmission frames; and
    b) a transmitter coupled to the memory for retrieving the transmission signal values from the memory in the format of the transmission frame, generating a modulated carrier signal including the transmission frame, and transmitting the transmission frame via the modulated carrier signal.

11. The network device for reporting one of a plurality of conditions to another network device across a data network of claim 10, wherein the transmission signal values include a network address of the remote computing device, a network address of the network appliance, a network protocol complaint preamble and message data.

12. The network device for reporting one of a plurality of conditions to another network device across a data network of claim 11, wherein the memory stores transmission signal values representing a plurality of transmission frames, each transmission frame including distinct message data.

13. The network device for reporting one of a plurality of conditions to another network device across a data network of claim 12, wherein the transmission signal values are stored in the memory as a digitized modulated carrier signal and the transmitter includes a D/A converter receiving the transmission signal values and outputting the modulated carrier.

14. The network device for reporting one of a plurality of conditions to another network device across a data network of claim 12, wherein the transmission signal values represent a base band transmission and the transmitter includes a mixer for mixing the base band transmission up to a carrier frequency and a D/A converter for generating the modulated carrier.

15. The network device for reporting one of a plurality of conditions to another network device across a data network of claim 12, wherein the transmission signal values represent a base band transmission and the transmitter a D/A converter generating an analog base band signal and an analog mixer for generating the modulated carrier.

16. A method of reporting a condition to a remote computing device, the method comprising:

a) detecting the condition and generating a signal representative thereof;

b) selecting a transmission frame corresponding to the condition from a plurality of transmission frames prestored in a memory, the transmission frames having a format complying with a predetermined network protocol for transmission frames; and c) transmitting the selected transmission frame on a network backbone by retrieving the transmission frame from the memory in the format of the transmission frame.

17. The method of reporting a condition to a remote computing device of claim 16, wherein the transmission frame is stored as a sequence of values representing a digitized modulated carrier and transmitting the selected transmission frame includes clocking the sequence of values into an D/A converter to generate a modulated carrier signal.

18. The method of reporting a condition to a remote computing device of claim 16, wherein the transmission frame is stored as a sequence of values representing a base band signal and transmitting the selected transmission frame includes mixing the base band signal up to sequence of values representing a modulated carrier and clocking the sequence of values into an D/A converter to generate a modulated carrier signal.

19. The method of reporting a condition to a remote computing device of claim 16, wherein the transmission frame is stored as a sequence of values representing a base band signal and transmitting the selected transmission frame includes clocking the base band signal into a D/A converter to generate an analog base band signal and mixing the analog base band signal with a carrier signal to generate a modulated carrier signal.

* * * * *